United States Patent [19]
Erdle

[11] 3,886,654
[45] June 3, 1975

[54] METHOD OF MANUFACTURING LAMINATED BUS BARS

[75] Inventor: Harvey B. Erdle, Rochester, N.Y.

[73] Assignee: Eldre Components, Inc., Rochester, N.Y.

[22] Filed: Jan. 22, 1974

[21] Appl. No.: 435,598

[52] U.S. Cl.................. 29/624; 29/193; 174/72 B; 174/117 FF
[51] Int. Cl. ......................................... H01b 13/00
[58] Field of Search................. 29/624, 193, 193.5; 174/68.5, 68 B, 70 B, 71 B, 72 B, 88 B, 99 B, 120 R, 133 B, 117 FF, 126 CP, 129 B, 149 B, 110 SR, 110 PM, 110 V; 317/261; 156/60, 6 S, 213, 214, 216, 222, 228, 235

[56] References Cited
UNITED STATES PATENTS

| | | | |
|---|---|---|---|
| 3,264,403 | 8/1966 | Erole | 174/72 B |
| 3,400,303 | 9/1968 | Rowlands et al. | 174/72 B X |
| 3,448,355 | 6/1969 | Ahearns et al. | 174/72 B |
| 3,708,609 | 1/1973 | Iosue et al. | 174/72 B |

FOREIGN PATENTS OR APPLICATIONS

| | | | |
|---|---|---|---|
| 1,464,631 | 1/1967 | France | 317/261 |

Primary Examiner—C. W. Lanham
Assistant Examiner—Joseph A. Walkowski
Attorney, Agent, or Firm—Shlesinger, Fitzsimmons & Shlesinger

[57] ABSTRACT

These bus bars are made from thin, copper plate stampings having flat, transverse conductor strips connected at their ends to integral, longitudinally extending looms or webs, which hold the strips in spaced relation. The stampings are stacked on a fixture in alternating relation with similarly shaped layers of insulation, which have marginal edges that overlap around the edges of the stampings, and are held in registry by pins which extend from the fixture into engagement with the webs and/or holding tabs that project from the edges of the strips. The assembly is subjected to a first pressing operation which bonds the stacked layers together except in the zones occupied by the webs and holding tabs. The assembly is then removed from the fixture, and the webs and tabs are removed by bending them manually until they fracture. The assembly is then subjected to a second and final pressing operation which seals the insulation around the areas formerly occupied by the side webs and tabs; and the completed bars are separated by cutting away excess insulation at opposite sides of the assembly.

10 Claims, 9 Drawing Figures

METHOD OF MANUFACTURING LAMINATED BUS BARS

This invention relates to laminated bus bars, and more particularly to a novel method for manufacturing these bars in large quantities.

Laminated bus bars of the type hereinafter described are used extensively in electronic devices where it is desirable to distribute power and ground to numerous points, with high capacitance and low inductance. Typically these bars comprise one or more elongate, flat conductors, each having a plurality of spaced, integral lugs or terminals projecting from one or both longitudinal edges thereof. The conductors are laminated between layers of dielectric insulating material, the marginal edges of which project slightly beyond, and are sealed around, the outer edges of the conductors. The conductors usually are similar in configuration, although in many instances the terminals on adjacent conductors are spaced differently so as to be laterally offset from each other in the assembly, thereby minimizing the possibility of accidental shorting between conductors.

For purposes of mass production it has been common practice to stamp or etch large quantities of these flat conductors from a single sheet of copper foil. In this way several identical conductors may be formed in spaced, parallel relation between marginal side portions of each copper sheet or stamping. This permits several different sheets or stampings to be arranged one above the other with their respective flat conductors registering vertically, and in some instances with the terminals of adjacent conductors laterally offset from each other. In these positions the several stacks of registering conductors can be laminated simultaneously between registering layers of dielectric material to form a plurality of bars which can be separated merely by cutting opposite ends of each bar from the marginal side portions of the assembly.

One major problem encountered in assemblying bars of the type described has been the difficulty in holding the several layers of conductors and insulation in proper vertical registry during the laminating operation. Heretofore, it has been customary to arrange a plurality of pins on the face of a fixture in the outline of assembly, and to stack the several layers so that their edges are bounded by or guided between the spaced pins. Hand assembly of a stack in this manner is extremely time consuming. Although pins can also be inserted through openings in the removable end webs to help hold the assembly on the fixture, they cannot be inserted through the conductor strips portions.

Another problem heretofore encountered with bus bars assembled in this manner is that once opposite ends of the laminated bars are cut from the marginal side portions of the assembly, the ends of the severed conductors in each bar are exposed, thereby increasing the possibility of adjacent conductors shorting on each other, and otherwise exposing the bars to undesirable grounding or shorting on adjacent metal surfaces. To avoid this, and to completely insulate this type of bus bar, it has been customary, after severing opposite ends of the bars from the discardable portions of the assembly, to dip or otherwise apply a final coat of dielectric insulation to the exposed portions of the conductors.

A primary object of this invention to provide a substantially more rapid and efficient method for assembling laminated bus bars of the type described. To this end it is an object also of this invention to provide a novel method of accurately maintaining the various layers of conductors and insulation in an assembly thereof in proper alignment during the lamination of the bus bars.

Another object of this invention is to laminate the assembled bars in two separate pressing operations, so that disposable portions of the conductor blanks, which are used to hold the blanks during assembly, can be removed and discarded between the two pressing operations.

A further object of this invention is to provide a novel, two-stage laminating operation which enables discardable holding portions of a bus bar assembly of the type described to be removed by cold-working before the final laminating operation.

It is an object also of this invention to eliminate the need for insulating opposite ends of the various conductors in a bar, after the bars have been separated from discardable portions of an assembly of the type described.

Other objects of the invention will be apparent hereinafter from the specification and from the recital of the appended claims, particularly when read in conjunction with the accompanying drawings.

Figure 8:
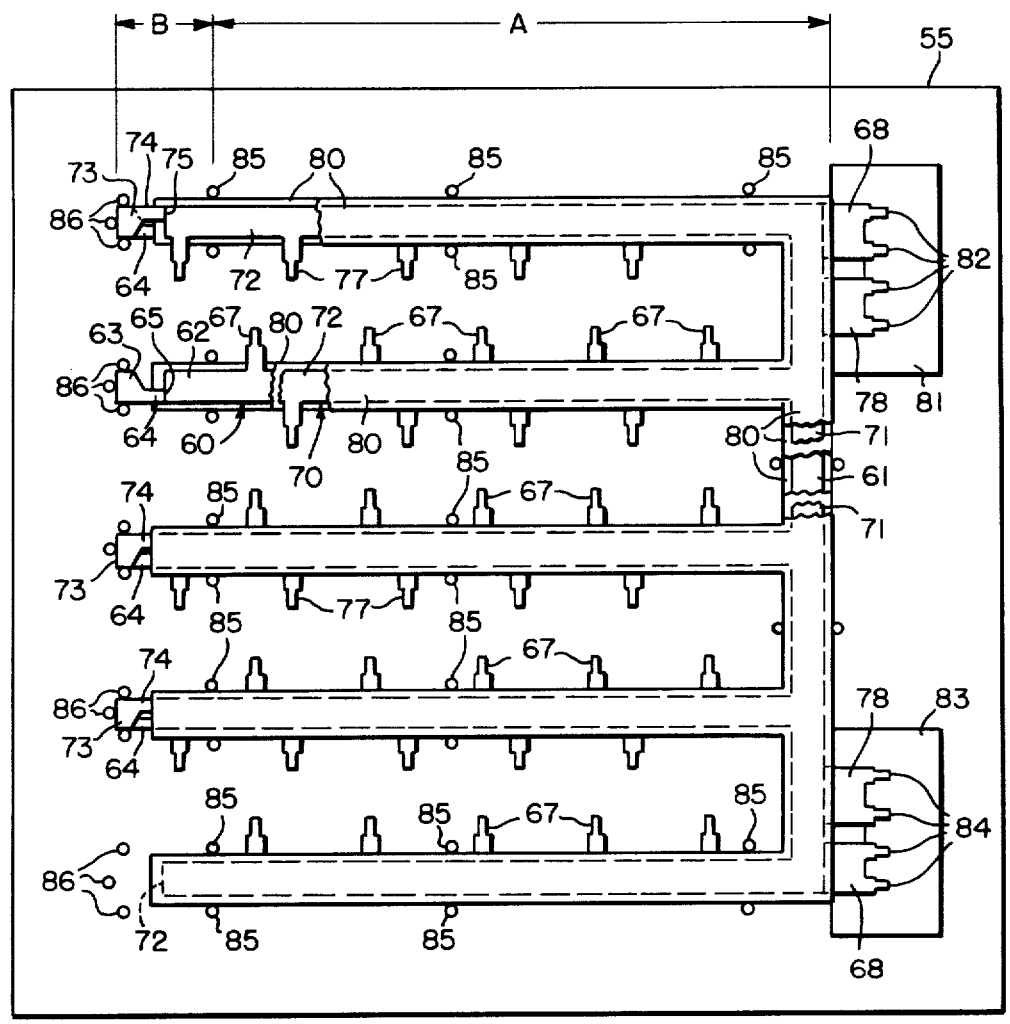
Figure 9:
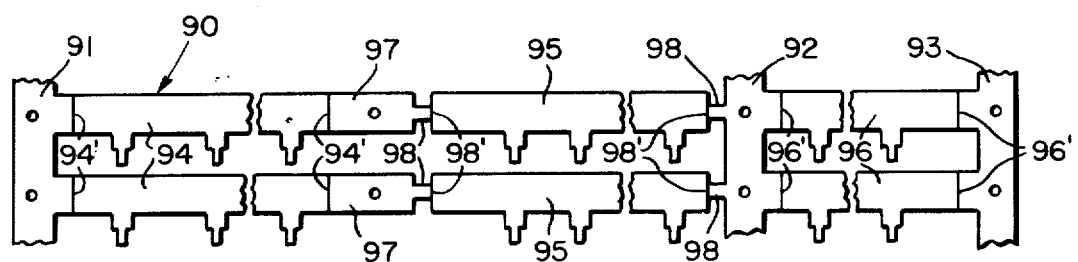

FIG. 8 is a plan view of a modified fixture having spaced elements thereon for holding finger-type conductor blanks and insulation therefor during assembly of bus bars made in accordance with another embodiment of this invention, a bus bar assembly being shown on the fixture with portions thereof cut away for purposes of illustration, and with one finger of this assembly being shown in its final or completely molded stage; and FIG. 9 is a fragmentary plan view of still another type of metal stamping or blank that may be used to manufacture bus bars in accordance with another embodiment of this invention.

Referring now to the drawings by numerals of reference, and first to FIGS. 1 to 3, 10, 20 and 30 denote, respectively, three different metal blanks or stampings comprising, respectively, a pair of spaced, parallel, longitudinally extending side webs or looms 11, 21 and 31, and a plurality of spaced, parallel, transversely extending conductor strips 12, 22 and 32, which at opposite ends thereof are connected to the associated side webs by narrow connector portions 13, 23 and 33, respectively. At its inner end each connector portion 13, 23, and 33 is crimped or cut part way through as at 13', 23' and 33', respectively, along a line which coincides with the adjacent end of the respective conductor strips 12, 22 and 32, respectively.

Figure 1:
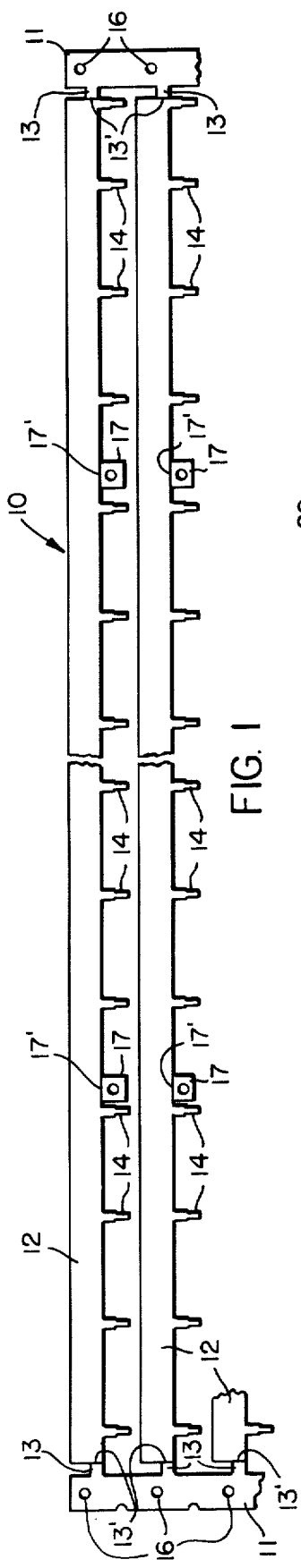
FIGS. 1 to 3 are, respectively, fragmentary plan views of three different metal blanks or stampings, which are employed in the mass production of laminated bus bars of the type made in accordance with one embodiment of this invention.
Figure 2:
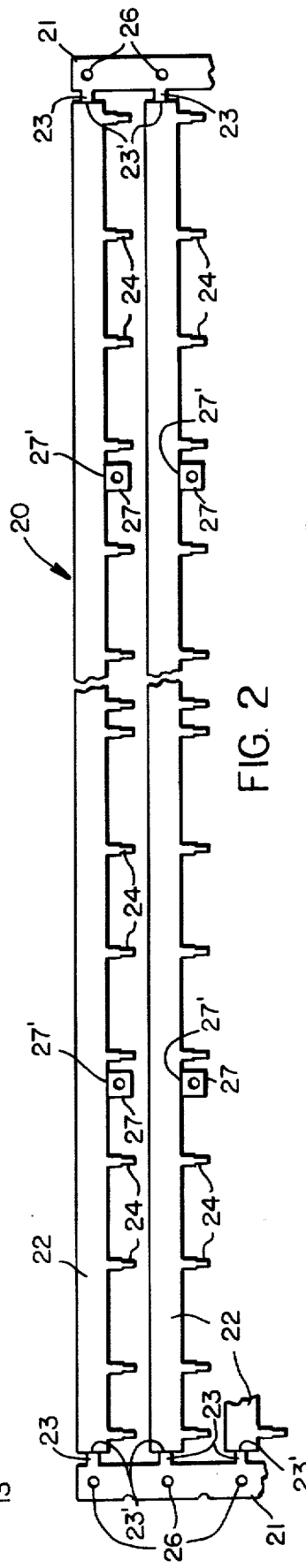
Figure 3:
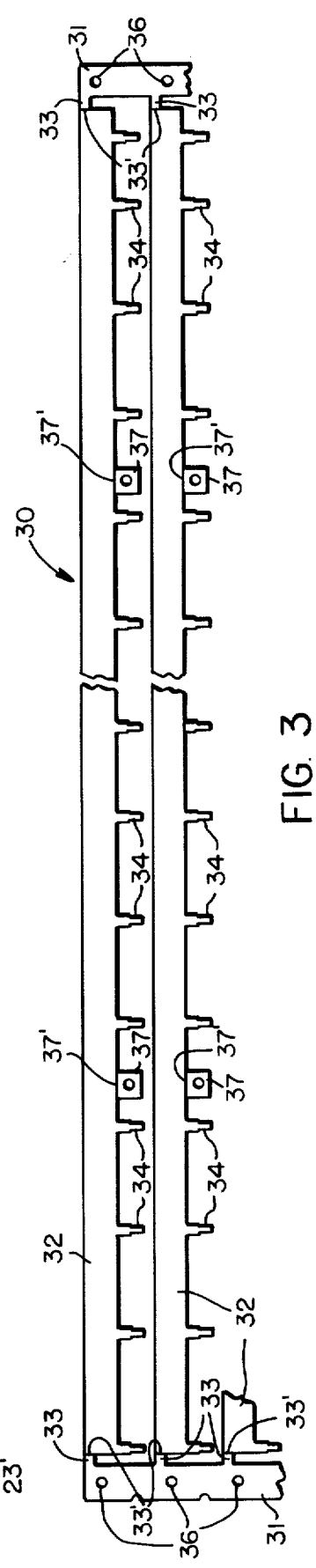
Figure 4:
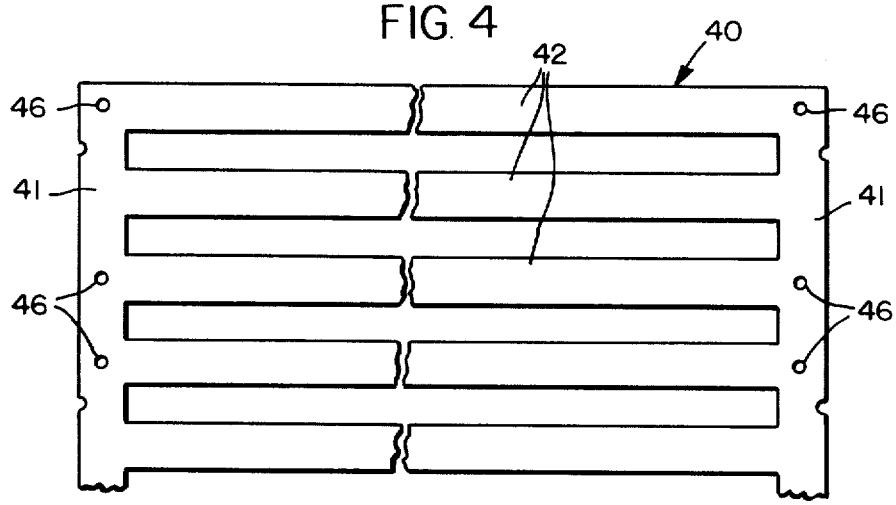
FIG. 4 is a fragmentary plan view of a typical layer of dielectric insulation, which is used in the assembly of bus bars made in accordance with this first embodiment of the invention.

Projecting from one side of each conductor strip 12, 22 and 32 (the lower sides thereof as shown in FIGS. 1 to 3) are a plurality of spaced, similarly shaped circuit tabs or terminals 14, 24 and 34, respectively. On each stamping the terminals 14, 24 and 34 are identically spaced from one another on each of the associated conductor strips 12, 22 and 32, respectively. However, while the end webs and transverse conductor strips of each stamping 10, 20 or 30 are generally similar in dimension and configurataion, whereby they can be stacked in registry with one another as noted hereinafter, in the illustrated embodiment the lateral spacing of the terminals 14, 24 or 34 on one stamping is different from the spacing of the terminals on the other stampings, so that when assembled, the terminals of one of the stampings 10, 20 or 30 will be laterally offset slightly relative to the terminals of the remaining two stampings. This offset form of terminal, of course, is shown merely by way of example, since such terminals may be designed to register vertically for certain applications.

Also by way of example, the various connecting portions 13, 23 and 33 of the conductor stampings, which are similar in size and configuration, are shown projecting, respectively, from adjacent the lower edges (FIG. 1) of the strips 12, medially of the edges of the strips 22, and from adjacent the upper edges of strips 32, so that these connecting portions also will be laterally offset from stamping to stamping.

To assist in the assembly of the stampings 10, 20 and 30, each of the side webs 11, 21 and 31 is provided with a plurality of longitudinally spaced, circular openings 16, 26 and 36, respectively, for accommodating centering pins as noted hereinafter. Also, intermediate its ends each of the conductor strips 12, 22 and 32 has projecting from one side thereof (the lower sides as shown in FIGS. 1 to 3) one or more apertured holding tabs 17, 27 and 37, respectively. Two such tabs are shown by way of example for each conductor strip in the illustrated embodiment. In a manner similar to the connector portions 13, 23 and 33, the inner ends of the holding tabs 17, 27 and 37 are crimped or cut part way through as at 17', 27' and 37', respectively, along lines that register with the adjacent side edges (the lower edges in FIGS. 1 to 3) of the associated conductor strips 12, 22 and 32, respectively.

The above-described stampings may be stamped (or etched) in known manner from, for example, copper coil stock 0.015 in. thick and approximately 15 in. wide, and may, if desired, be plated with a protective metal coating before or after stamping, also in known manner.

Figure 5:
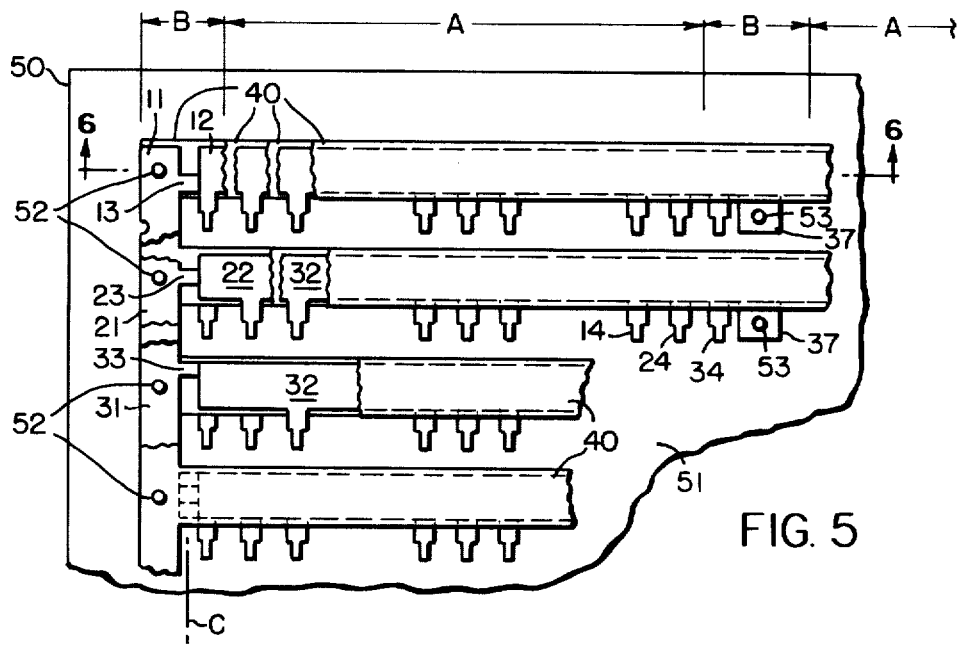
FIG. 5 is a fragmentary plan view of a fixture used during the assembly of these bus bars, and illustrating, also fragmentarily, a plurality of metal blanks or stampings and insulating layers therefor stacked over holding pins on the fixture in preparation of a pressing or laminating operation, portions of the insulation and metal stampings being cut away in part for purposes of illustration.
Figure 6:
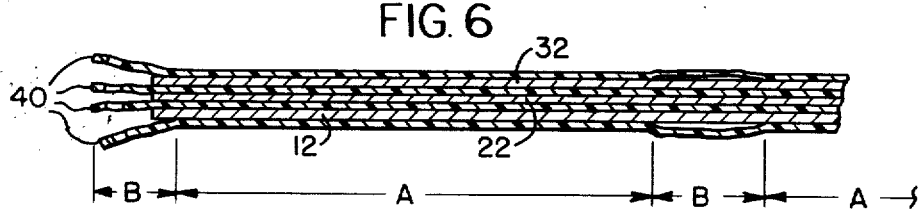
FIG. 6 is a fragmentary sectional view of one end of one of the assembled bus bars of FIG. 5, but showing the bar after the entire assembly has been partially molded and the discardable side looms and holding tabs for the metal stampings have been removed therefrom by cold working, the view being taken generally along the line 6—6 in FIG. 5.
Figure 7:
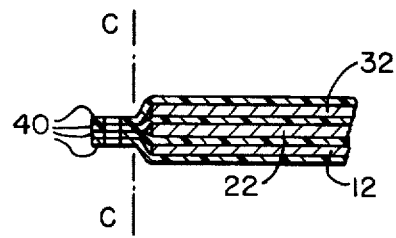
FIG. 7 is a fragmentary sectional view similar to FIG. 6, but illustrating the same end of this bus bar after the final molding operation.

Referring now to FIGS. 4 to 7, 40 (FIG. 4) denotes generally a typical insulator blank or laminate, which is used in this process for insulating the bus bar conductors from one another. This dielectric laminate may be cut or punched from a thin layer of plastic insulating material such as, for example, the type sold under the trade name "Amron." Each of these insulating layers or laminates comprises a pair of spaced side webs 41 interconnected by parallel, transversely extending insulator strips 42, which are spaced from one another the same distances as the conductor strips formed in the stampings 10, 20 and 30. The transverse strips 42 of each insulator 40 are made slightly wider, however, than the corresponding conductor strip sections 12, 22 and 32 of the stampings 10, 20 and 30, so that when the several stampings and layers of insulation are assembled as shown in FIG. 5, the marginal edges of the insulator strips 42 will project slightly laterally beyond the marginal side edges of the associated conductor strips; and the side webs 41 of each insulator 40 are also provided with spaced, circular openings 46, which are adapted to register with corresponding openings 16, 26 and 36 in the metal stampings to permit the insertion therethrough of the above-noted centering pins during assembly. Moreover, to secure together the laminates during the hereinafter described molding step, each layer of insulation is coated with a known adhesive of the type which is set by the application of heat and pressure. Obviously, however, other suitable adhesives could be used, for example, types which could be set by the application of heat or pressure.

In FIG. 5, 50 denotes an assembly fixture having a plane upper surface 51, and a plurality of spaced centering pins 52, which project from surface 51 to register with the openings 16, 26, 36 and 46 in the stacked stampings 10, 20, 30 and insulators 40 that are used in the assembly. Additional pins 53 project from the face of the fixture to register with the apertures in the holding tabs 17, 27 and 37 that are formed on the various stampings.

To assemble the bus bars a bottom, outer layer 40 of insulation is first placed on the surface 51 of the fixture with its openings 46 positioned over the corresponding centering pins 52. Then a stamping 10 is positioned over this first layer of insulation with its openings 16 also positioned over the pins 52, and with the apertures in its holding tabs 17 positioned over the pins 53. In a similar manner, stamping 10 is covered by the second layer 40 of insulation over which the stamping 20 is placed or stacked; and in turn, this stamping is covered by a third layer 40 of insulation, after which the third stamping 30 is stacked over the third layer of insulation; and finally an upper, outer layer 40 of insulation is placed over the top of the stamping 30 to complete the assembly. Although only one end of this assembly is shown in FIG. 5, it will be apparent that the narrow connecting portions 13, 23 and 33, which are located at each end of each stack of registering conductor strips 12, 22 and 32 in the assembly, are laterally offset slightly from one another, and are separated from each other by intervening layers 40 of insulation. Similarly, the terminals 14, 24 and 34 of the respective conductors 12, 22 and 32 in each stack thereof are offset from each other. Also at this time the transverse strip portions 41 of the assembled layers 40 of insulation project in overlapping relation slightly beyond the longitudinal side edges of the various conductor strips 12, 22 and 32 in each stack thereof, but not so as to enclose the terminals 14, 24 and 34.

One of the major problems heretofore encountered in assemblying similar laminated bus bars was that, because of their excessive length, there was a tendency for the conductor strips 12, 22 and 32 to bow upwardly or outwardly intermediate their ends at this stage, therefore making it extremely difficult to hold the strips in proper registry in preparation for the subsequent molding or laminating operation. This problem has been obviated by the instant invention through use of the small holding tabs 17, 27 and 37, and cooperating pins 53, which secure the various conductor strips against movement on fixture 50 during the assembly operation.

After assemblying the conductor stampings and insulator layers as illustrated in FIG. 5, the entire assembly is subjected to a first pressing operations by means of a heated assembly press (not illustrated), which applies heat and pressure to selected portions only of the assembly, thereby initially to bond together only those portions of the laminates which lie, for example, in zones A (FIGS. 5 and 6) of the assembly. The purpose of this partial molding step is to fix the various parts of the assembly together while leaving selected portions of the insulation and conductors (the portions denoted, for example, by zones B) unsealed or unbonded from one another. Specifically the zones B are locoated at opposite ends, respectively, of each stack of laminates, and centrally of each group of vertically registering (FIG. 5) holding tabs 17, 27 and 37.

After this partial laminating operation the assembly is removed from the fixture 50, and the end webs 11, 21 and 31 at each side of the assembly are bent back and forth manually relative to the assembly to cause fracture by cold working along the registering crimp lines 13', 23' and 33' at opposite ends of each stack of conductor strips. This operation completely removes from the assembly both the metal webs 11, 21 and 31, as well as their associated connecting portions 13, 23 and 33, respectively. The result is, as shown by way of example in FIG. 6, that at each side of the assembly the adjacent ends of the stacked conductor strips 12, 22 and 32 terminate in common plane disposed inwardly from the adjacent side webs or edges of the insulating layers 40.

At this same time also, the holding tabs 17, 27 and 37, which are located in the zones B, are removed manually by coldworking the tabs about their respective crimp lines 17', 27' and 37'.

After removal of the discardable metal end webs 11, 21 and 31, the connecting portions 13, 23 and 33, and the holding tabs 17, 27 and 37, the assembly is subjected to a second and final pressing or laminating operation which applies heat and pressure in all zones, including the zones B of the assembly. This seals together the overlapping portions of insulation along opposite sides of the assembly (see for example FIG. 7, which shows the same stack of conductors as in FIG. 6, but after the second molding operation), and in the areas formerly occupied by the tabs 17, 27 and 37, so that the ends and longitudinal side edges of each stack (excluding terminals 14, 24 and 34) of conductor strips 12, 22 and 32 are sealed within the laminated layers of insulation.

After the second molding operation the bus bars are separated by cutting away the sealed end webs 41 of insulation, for example by cutting through the insulation at each side of the assembly along a line C(FIGS. 5 and 7), which extends approximately centrally through the areas formerly occupied by the connecting portions 13, 23 and 33 of the conductors. Each bus bar thus produced is sealed entirely around its outer edges, except for those areas where the terminals 14, 24 and 34 project through the insulation for attachment in electrical circuits.

From the foregoing it will be apparent that the instant invention considerably expedites the assembly of bus bars of the type disclosed herein. By crimping the connecting portions 13, 23 and 33, and the holding tabs 17, 27 and 37 along their inner edges prior to assembly, and by initially molding only the portion of the assembled bars which do not register with these connecting portions and tabs, it is a relatively simple matter for an operator quickly to remove the undesirable portions of the metal stampings merely by bending these portions back and forth relative to the assembly until they fracture along their crimp lines. Consequently, unlike prior, known methods of assesmbly, the necessity of performing a further insulating step, subsequent to the molding operation is obviated. Moreover, by using the break-away holding tabs 17, 27 and 37, it is possible to hold the elongate conductor strips 12, 22 and 32 securely and in accurate registry with one another at least until the first molding step has been completed. Thereafter, as noted above, these tabs can be broken along lines coincident with the adjacent edges of their associated conductor strips, so as to prevent any interference with the final and complete sealing of the insulation around the outer edges of the conductor strips.

Referring now to the embodiment illustrated in FIG. 8, 55 denotes a modified fixture which is used to assemble a finger-type laminated bus bar made in accordance with another embodiment of this invention. In this embodiment two metal blanks or stampings, denoted generally at 60 and 70, are sandwiched or laminated between three, identical, finger-type layers 80 of insulation, which may be cut or punched from plastic, dielectric material of the type used for producing the insulation employed in the first embodiment.

Each metal stamping 60 comprises a single end web or loom 61 from one side of which project five, spaced, parallel, finger-like conductor strips 62, only one of which is viewable in part in FIG. 8. Similarly, stamping 70 comprises a single end web or loom 71 from one side of which project five, spaced, parallel, finger-like conductor strips 72 (only two of which are viewable in part in FIG. 8). to overlie the corresponding fingers 62 on the stamping 60, when the bar is assembled as shown in FIG. 8. At its terminal end (left end in FIG. 8) each strip 62 has thereon, prior to the completion of the bus bar, an integral holding tab 63, which is connected to the adjacent end of its strip 62 by a narrow connecting portiion 64. Each portion 64 is crimped or cut part way through at its inner end as at 65 along a line which registers with the remaining, terminal end of the strip 62.

At its terminal end each conductor strip 72 has integral therewith a holding tab 73, which is connected to the adjacent end of the associated strip 72 by a narrow connecting portion 74, and which also is crimped or cut part way through as at 75 along a line which registers with the remaining terminal end of the associated strip 72. As in the case of the connecting portions 13, 23 and 33 in the first embodiment, the connecting portion 64 and 74 are disposed to be offset vertically from one another in each finger portion of the assembly as shown in FIG. 8.

Intermediate its ends each of the strips 62 in the four lowermost fingers as illustrated in FIG. 8 has projecting from its upper edge a plurality of spaced circuit tabs or terminals 67. Each of the conductor strips 72 in each of the four uppermost fingers shown in FIG. 8 has projecting from its lower edge a plurality of spaced circuit tabs or terminals 77. Also in this embodiment, the terminals 67 are located so as to be laterally offset from the terminals 77 when their associated conductor strips are assembled in the bus bar.

Each of the stampings 60 and 70 also has a pair of integral, spaced, bifurcated input terminals 68 and 78, respectively, which project from the side of the associated end web 61 or 71 opposite to that from which the associated conductors strips 62 or 72 project. The input tabs 68 are located also so as to be laterally offset from the input tabs 78, when the stampings 60 and 70 are assembled.

Secured to the face of fixture 55 adjacent one side edge thereof are two holding blocks 81 and 83, which have in their inner surfaces a plurality of spaced notches 82 and 84, respectively, for accomodating the bifurcated ends of the input terminals 68 and 78. Projection from the face of fixture 55 inwardly, or to the left of blocks 81 and 83 as illustrated in FIG. 8, are a plurality of pins 85, which are arranged to flank or embrace the outer edges of the layers 80 of insulation at spaced points therealong during the assembly operation.

To assemble the bus bar, the lower or bottom layer 80 of insulation is placed on the face of fixture 55 between the pins 85, and a stamping 60 is then positioned on top of this insulation with each of its input tabs 68 projecting into a registering pair (the outer pair) of recesses 82 and 84 in the holding blocks 81 and 83, respectively. Thereafter a second layer of insulation 80 is placed over the stamping 60; the stamping 70 is placed on top of the second layer of the insulation so that each of its input tabs project into a second pair (the inner pair) of the recesses 82 and 84, respectively, in the blocks 81 and 83; and thereafter the last or upper layer 80 of insulation is placed over the stamping 70 to complete the assembly.

To hold the fingers or conductor strips 62 and 72 in proper position during this assembly operation, a plurality of positioning or holding pins 86 project from the face of the fixture 55 adjacent the outer or terminal end of each of the five fingers of the bus bar. Three such pins 86 are arranged in triangular fashion at the end of each finger, so that two pins of each set embrace opposite sides of the assembly tabs 63 and 73 which are positioned one above the other in each finger assembly, and so that the third pin of the set engages the outer or terminal edges of these tabs to hold the input tabs 68 and 78 in the holding blocks 81 and 83.

After this operation the assembled laminations are subjected to a first or initial laminating or pressing operation, which applies heat and pressure to a portion only of the assembly, for example the portion indicated at zone A in FIG. 8. This causes the superposed layers of insulation to be heat-sealed completely around a major portion of the assembly, including the superposed end webs 61 and 71 of the conductor stampings, as well as major poprtions of the strip portions 62 and 72 thereof. The only sections of the assembly that are not completely laminated to one another at this time are the marginal end portions of the finger sections of the bus bar, or the sections located in the areas denoted by zone B in FIG. 8. Thus, as in the first embodiment, this partial molding operation leaves the superposed laminates unbonded in the areas of the crimped inner ends of the holding tabs 63 and 73, so that these tabs and their associated connecting portions 64 and 74 can be removed by bending them manually about their associated crimped lines 65 and 75, respectively. The finger portions of the insulation 80 project longitudinally slightly beyond the crimp lines 65 and 75 at the end of each bus bar finger, so that, as illustrated by the lowermost finger in FIG. 8, the terminal ends of the conductor strips 62 and 72 will be spaced slightly inwardly from the terminal ends of the insulation after the tabs 63 and 73 have been removed.

After the removal of tabs 63 and 73, a final laminating operation takes place to bond together the entire assembly including the layers 80 of insulation in the zones B to seal the overlapping marginal edges of the insulation around the outer edges of the conductor strips 62 and 72 except, of course, for those area where the terminals 67 and 77 project out of the insulation for connection to electrical circuits.

From the foregoing it will be apparent that, as in the first embodiment, the use of the movable holding tabs 63 and 73 not only permit more rapid and accurate assembly of the components of the finger-type laminated bus bar, but also obviate the need for performing any separate cutting step to remove these tabs, and any subsequent insulating step that would therefore be necessary. Moreover, the holding blocks 81 and 83 and the positioning pins 85 and 86 provide extremely simple and reliable means for quickly and accurately locating the various laminations relative to one another during assembly.

While the tabs 74 are shaped differently from the holding tabs 17, 27 and 37 of the first embodiment, it will be apparent that their exact shape, and whether or not they are provided with apertures to accomodate holding pins, and matters of choice. Moreover, while the crimp lines for the holding tabs are shown coincident with the adjacent ends of the associated conductor strips, it will be apparent that they may be spaced slightly therefrom, provided the registering portions of insulation project at least slight distances beyond the crimp lines so that the fracture lines will be spaced inwardly of the overlapping edges of insulation in the completed bars. Moreover, if desired, additional holding tabs could be spaced along the strip sections and end web, or could be made to project from the tip of one or more of terminals 67.

FIG. 9 illustrates still another way in which removable holding tabs or looms can be incorporated into metal blanks or stampings used in the mass production of laiminated bus bars. In this FIG. 9 denotes a metal blank comprising longitudinally extending looms 91, 92 and 93, and transversely extending conductor strips 94, 95 and 96. At one end each strip 94 is integral with the side loom 91, and it its opposite end with an apertured holding tab 97. The strips 95 are connected at opposite ends thereof with the tabs 97 and loom 92, respectively, by narrow connector strips 98. The strips 96 are integral at opposite ends with the loom 92 and 93, respectively.

To permit removal of the loom 91, 92, 93 and the tabs 97 after an initial or first pressing operation of the type described above, the strips 94 and 96 are scored or cut part way through adjacent opposite ends thereof along crimp lines 94' and 96' respectively; and the connecting portions 98 are similarly crimped intermediate their ends as at 98'.

When blanks of the type shown in FIG. 9 are laminated between similarly shaped layers of insulation in the manner described above, the looms 91, 92, 93 and tabs 97 can be removed by cold workings after the first pressing operation, and thereafter the final laminating step may be performed. Since insulation covers the areas formerly occupied by the discarded sections of the metal blanks, the conductor strips 94, 95 and 96 in the assembly will be sealed around their edges between overlapping layers of insulation after the second pressing operation. The laminated bars may then be separated from each other as in the first embodiment.

From FIG. 9 it will be apparent that, while the use of narrow connecting portions at opposite ends of the conductor stripes ease the cold working operation, it is possible merely to employ crimp lines as at 94' and 96' without using, narrow connecting portions. Moreover, while in FIG. 9 the crimp lines 98' register with the ends of strips 95, it is not necessary, because the registering strips of insulation are not removed, when the tabs 97 and the loom 92 are removed, so that ample insulation will remain to enclose opposite ends of strips 95 during the final pressing operation.

While this invention has been described in connection with only certain embodiments thereof, this application and the appended claims are intended to cover not only the embodiments disclosed herein, but any such modifications thereof that may fall within the scope of one skilled in the art.

I claim:

1. A method of producing laminated bus bars from flat, electrically conductive blanks of the type having at least a pair of spaced side sections connected by a plurality of transverse strip sections, comprising stacking a plurality of said electrically conductive blanks and a plurality of flat, dielectric insulator blanks in alternating relation, with the spaced side sections and the transverse strip sections on each electrically conductive blank registering vertically with similarly shaped side and strip sections, respectively, on the remaining blanks in the stack, and with the insulator blanks having overlapping marginal edges projecting slightly beyond the edges of the electrically conductive blanks, laminating part of the stacked blanks to bond together registering portions thereof other than in the areas of said side sections, removing said side sections of the electrically conductive blanks from the strip sections thereof after the first-named laminating operation, laminating the remainder of the stacked blanks to bond together overlapping portions of the insulator blanks in the areas previously occupied by the side sections of the electrically conductive blanks, and severing the laminated portions of the insulator blanks in the areas previously occupied by said side sections of said electrically conductive blanks to separate the spaced stacks of laminated strip sections from each other.

2. A method as defined in claim 1, including removing said side sections from the electrically conductive blanks by repeatedly bending the last-named sections about crimp lines which are formed in and which cut part way through one surface of each electrically conductive blank adjacent opposite ends, respectively, of each of its strip sections.

3. A method as defined in claim 2, including
   stacking said blanks on a fixture having thereon locating pins which project through registering openings in said side sections of said blanks to hold the blanks in registry on said fixture,
   forming said electrically conductive blanks with a plurality of holding tabs which project from the edges of said strip sections of the last-named blanks, and which are held against movement on said fixture by a further plurality of locating pins during said first-named laminating operation, and
   removing said tabs from said electrically conductive blanks prior to the second-named laminating operation by fracturing said tabs at their junctures with their associated strip sections.

4. A method as defined in claim 1, including
   forming each electrically conductive blank with its strip sections extending parallel to each other between the two side sections of the blank, and with each strip section having narrow connecting portions of reduced width at opposite ends thereof integral with the side sections of the blank and cut part way through along crimp lines spaced inwardly from said side sections,
   removing both said side sections and said connecting portions of each electrically conductive blank after said first-named laminating operation by repeatedly bending said side sections and connecting portions about said crimp lines until fracture occurs along the last-named lines, and
   during said severing operation cutting substantially medially through the areas previously occupied by said connecting portions.

5. A method for producing laminated bus bars, comprising
   forming a plurality of flat, electrically-conductive blanks having spaced holding tabs projecting from the edges thereof,
   assemblying a plurality of the blanks on a fixture in alternating, registering relation with similarly shaped layers of dielectric insulation having overlapping marginal edges which project beyond the edges of said blanks,
   releasably holding the assembly on the fixture with a plurality of locating elements, at least certain of which engage said spaced holding tabs to hold the blanks and layers of insulation in registry on the fixture,
   laminating part of the assembly to bond together areas thereof other than the areas occupied by said tabs,
   severing the holding tabs from the blanks along lines spaced inwardly from the edges of said insulation, and
   laminating the remaining part of the assembly to bond together the areas thereof previously occupied by said tabs.

6. A method as defined in claim 5, including cutting part way through said tabs along said lines during the formation of said blanks, and bending the tabs about said lines during said severing operation until the tabs fracture from the blanks.

7. A method as defined in claim 6, including assemblying said blanks on pins which extend from the fixture through registering openings in at least certain of said tabs, and removing the assembly from the fixture after the first-named laminating operation.

8. A method as defined in claim 5, including forming each blank with at least one side section and with a plurality of spaced, transverse strip sections projecting from one edge of said side section, the side and strip sections of each blank being disposed to be stacked in vertical registry with correspondingly shaped side and strip sections, respectively, in the other blanks in the assembly, and forming at least one of said tabs on each strip section of a blank to project from one edge of the strip section, and with the inner end of each tab being cut partway through along a crimp line which disposed adjacent the edge of the strip section from which the tab projects.

9. A method as defined in claim 8, including forming each blank with two, spaced side sections, and with its strip sections extending transversely between said side sections and being cut part way through adjacent opposite ends thereof along crimp lines disposed to register vertically with corresponding crimp lines in the other blanks in the assembly, leaving the assembly unbonded in the areas of said side sections and said tabs during the first-named laminating operation, removing the side sections and tabs from the blanks during the severing operation by bending them until they fracture along their associated crimp lines, bonding together the areas formerly occupied by said side sections and tabs during the second-named laminating operation, and severing the overlapping, laminated layers of insulation in the areas previously occupied by said side sections to separate the stacks of laminated strip sections from each other.

10. A method as defined in claim 9, including forming a holding tab intermediate the ends of each of said strip sections by cutting part way through each strip section along a pair of spaced crimp lines positioned between the two crimp lines located adjacent opposite ends, respectively, of each strip section during the formation of said blanks, securing the last-named tab against movement of said fixture by a pin which projects from the fixture through an opening in said last-named tab of each strip section during said assemblying operation, and removing said last-named tabs prior to the final laminating operation by cold-working them about said pairs of crimp lines.

* * * * *